(12) United States Patent
VanBlon et al.

(10) Patent No.: US 9,460,067 B2
(45) Date of Patent: Oct. 4, 2016

(54) AUTOMATIC SENTENCE PUNCTUATION

(71) Applicant: Lenovo (Singapore) Pte. Ltd., Singapore (SG)

(72) Inventors: Russell Speight VanBlon, Raleigh, NC (US); Suzanne Marion Beaumont, Wake Forest, NC (US); Jefferson Logan Holt, Rolesville, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 267 days.

(21) Appl. No.: 14/067,321

(22) Filed: Oct. 30, 2013

(65) Prior Publication Data

US 2015/0120281 A1    Apr. 30, 2015

(51) Int. Cl.
| | |
|---|---|
| *G10L 21/00* | (2013.01) |
| *G10L 15/00* | (2013.01) |
| *G10L 25/00* | (2013.01) |
| *G06F 17/24* | (2006.01) |

(52) U.S. Cl.
CPC ..................................... *G06F 17/24* (2013.01)

(58) Field of Classification Search
USPC ............ 704/235, 243, 246, 270, 270.1, 275
See application file for complete search history.

(56) References Cited

U.S. PATENT DOCUMENTS

| | | | | |
|---|---|---|---|---|
| 4,829,576 | A * | 5/1989 | Porter | G06F 3/167 704/235 |
| 4,914,704 | A * | 4/1990 | Cole | G06F 17/21 704/235 |
| 5,373,566 | A * | 12/1994 | Murdock | G06K 9/685 382/156 |
| 5,463,696 | A * | 10/1995 | Beernink | G06K 9/00429 382/186 |
| 5,550,930 | A * | 8/1996 | Berman | G06K 9/033 382/187 |
| 5,666,139 | A * | 9/1997 | Thielens | G06F 17/24 345/173 |
| 5,855,000 | A * | 12/1998 | Waibel | G06K 9/03 382/186 |

(Continued)

*Primary Examiner* — Edgar Guerra-Erazo
(74) *Attorney, Agent, or Firm* — Ference & Associates LLC

(57) ABSTRACT

An aspect provides a method, including: receiving, at an information handling device input component, user input comprising a sentence; identifying, using a processor, the sentence; determining, using the processor, correct punctuation for the sentence identified; determining, using the processor, a confidence level for the correct punctuation determined; and responsive to the confidence level exceeding a predetermined threshold, automatically modifying, using the processor, the sentence based on the correct punctuation determined. Other embodiments are described and claimed.

20 Claims, 2 Drawing Sheets

(56) References Cited

U.S. PATENT DOCUMENTS

| | | | | |
|---|---|---|---|---|
| 5,884,258 A * | 3/1999 | Rozak | ............... | G06F 3/16 704/231 |
| 5,909,667 A * | 6/1999 | Leontiades | ............... | G06F 3/167 704/235 |
| 6,067,514 A * | 5/2000 | Chen | ............... | G10L 15/18 704/235 |
| 6,438,523 B1 * | 8/2002 | Oberteuffer | ............... | G06F 3/038 382/186 |
| 6,718,303 B2 * | 4/2004 | Tang | ............... | G10L 15/26 704/215 |
| 6,778,958 B1 * | 8/2004 | Nishimura | ............... | G10L 15/18 704/235 |
| 7,137,076 B2 * | 11/2006 | Iwema | ............... | G06K 9/00436 345/179 |
| 7,580,838 B2 * | 8/2009 | Divay | ............... | G06F 17/2725 704/257 |
| 7,684,990 B2 * | 3/2010 | Caskey | ............... | G10L 15/22 704/255 |
| 7,921,374 B2 * | 4/2011 | Griffin | ............... | G06F 3/0237 715/780 |
| 8,036,878 B2 * | 10/2011 | Assadollahi | ............... | G06F 3/0237 704/10 |
| 8,131,718 B2 * | 3/2012 | Tran | ............... | G06F 17/30867 707/732 |
| 8,374,846 B2 * | 2/2013 | Assadollahi | ............... | G06F 3/0234 704/10 |
| 8,374,850 B2 * | 2/2013 | Assadollahi | ............... | 704/10 |
| 8,433,572 B2 * | 4/2013 | Caskey et al. | ............... | 704/255 |
| 8,447,285 B1 | 5/2013 | Bladon et al. | | |
| 8,719,004 B2 * | 5/2014 | Siminoff | ............... | G10L 15/265 704/257 |
| 2002/0069055 A1 * | 6/2002 | Tang | ............... | G10L 15/26 704/235 |
| 2004/0138881 A1 * | 7/2004 | Divay | ............... | G06F 17/2725 704/231 |

* cited by examiner

AUTOMATIC SENTENCE PUNCTUATION

BACKGROUND

Information handling devices ("devices"), for example cell phones, smart phones, tablet devices, laptop and desktop computers, e-readers, etc., employ one or more input devices for entering text input. Among these input devices are keyboards, touch screens, other input surfaces (e.g., digitizer) and even microphones for speech-to-text applications.

Commonly there are assistive technologies implemented for correcting or modifying user input automatically in an effort to provide automatic assistance to the user in the form of minor corrections or modifications/additions to the literal user input. For example, most applications now include some form of spell checking functionality, which in some forms auto-corrects commonly misspelled words without further user input. As another example, often the entry of two space character inputs (e.g., while typing on a keyboard) is followed by an automated placement of period character input at the end of a preceding text string. A further example includes supplying the correct contraction for a word form, e.g., "its" versus "it's" or "they're" for the literal input of "theyre". Often suggestions are provided or supplied for correcting words rather than automated correction thereof.

BRIEF SUMMARY

In summary, one aspect provides a method, comprising: receiving, at an information handling device input component, user input comprising a sentence; identifying, using a processor, the sentence; determining, using the processor, correct punctuation for the sentence identified; determining, using the processor, a confidence level for the correct punctuation determined; and responsive to the confidence level exceeding a predetermined threshold, automatically modifying, using the processor, the sentence based on the correct punctuation determined.

Another aspect provides an information handling device, comprising: an input component; a processor; a memory device assessable to the processor and storing code executable by the processor to: receive, at the input component, user input comprising a sentence; identify, using the processor, the sentence; determine, using the processor, correct punctuation for the sentence identified; determine, using the processor, a confidence level for the correct punctuation determined; and responsive to the confidence level exceeding a predetermined threshold, automatically modify, using the processor, the sentence based on the correct punctuation determined.

A further aspect provides a program product, comprising: a storage device having computer readable program code stored therewith, the computer readable program code comprising: computer readable program code configured to receive, at an information handling device input component, user input comprising a sentence; computer readable program code configured to identify, using a processor, the sentence; computer readable program code configured to determine, using the processor, correct punctuation for the sentence identified; computer readable program code configured to determine, using the processor, a confidence level for the correct punctuation determined; and computer readable program code configured to, responsive to the confidence level exceeding a predetermined threshold, automatically modify, using the processor, the sentence based on the correct punctuation determined.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
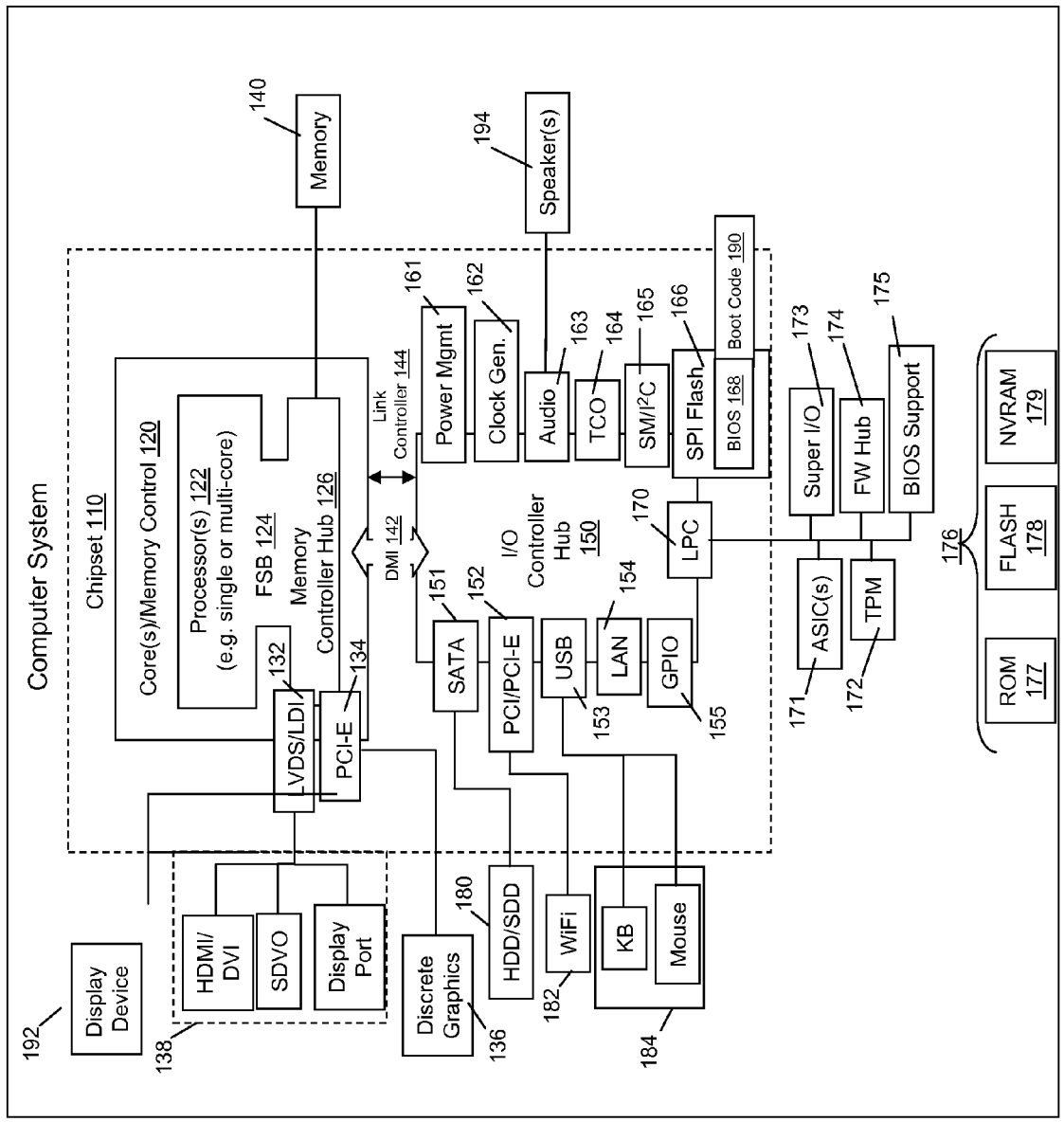
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While some assistive technologies exist for modifying user input, there is no current method to automatically add the correct punctuation to a sentence, e.g., based on sentence type. For example, current voice recognition methods require the user to speak the desired punctuation. For example, voice input of "Where are you" must be followed by voice input of "question mark" for the text converted input of "Where are you?" to result. Among other drawbacks, this requires more time/effort from the user to use the speech-to-text application. Such an approach, while workable, also requires the users to know they should speak punctuation and in any event tends to break the natural flow of the language input and thought process of the users.

Methods do exist to add punctuation to individual words in the form of contractions (e.g., what's, he's, etc.). While helpful, this amounts to an addition to spell checking at the word level and there remains no way to automatically punctuate sentences (e.g., appropriate addition of a question mark, an exclamation point, a comma, a period, etc.).

Methods also exist to suggest the user supply input punctuation. For example, in MICROSOFT WORD applications, typing "Where are you" without punctuation results in a "suggestion" (in the form of colored underlining) that a something is amiss (in this case, a question mark is in fact missing). However, this does not clearly identify what is missing (as it is not known to the software) and thus there is no way to add punctuation automatically. The only choices for the user in such a case are to insert the appropriate punctuation mark manually or perform a series of inputs, e.g., to open suggestions regarding corrections that may be supplied.

As noted herein, periods are automatically inserted when typing two spaces in some applications. However, no intelligence is used to determine if a period is actually the correct punctuation mark for the sentence in question, e.g., based on the sentence to which the punctuation is being applied. Again, this in many instances exacerbates the problem rather than alleviates it, i.e., by actually adding the wrong punctuation mark.

Accordingly, an embodiment automatically supplies appropriate punctuation based on the sentence. Thus, an embodiment may automatically assist, e.g., insert, remove, rearrange or generally "modify" punctuation mark(s), to supply, automatically, the appropriate punctuation. An embodiment provides automated punctuation based on a confidence metric derived from analysis at the sentence level, identifying the correct punctuation, comparing the literal punctuation used (if any) to the correct punctuation determined or identified, and, if a confidence level threshold has been exceed, automatically modifying the punctuation for the user. Accordingly, utilizing an embodiment, user input may be supplemented or assisted automatically via adding correct punctuation based on the type of sentence input. Various example embodiments are described throughout.

The illustrated example embodiments will be best understood by reference to the figures. The following description is intended only by way of example, and simply illustrates certain example embodiments.

While various other circuits, circuitry or components may be utilized, FIG. 1 depicts a block diagram of one example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Information handling devices, as for example outlined in FIG. 1, may be used with applications where a user inputs sentences (e.g., by way of keyboard input, pen or stylus handwriting input that is converted to machine text, voice input captured by a microphone and converted to machine text using a speech-to-text application, etc.). Common examples of such applications include word processing applications, email applications, text or SMS applications, etc. In many cases, the input needs to be modified or corrected to have correct punctuation.

Figure 2:
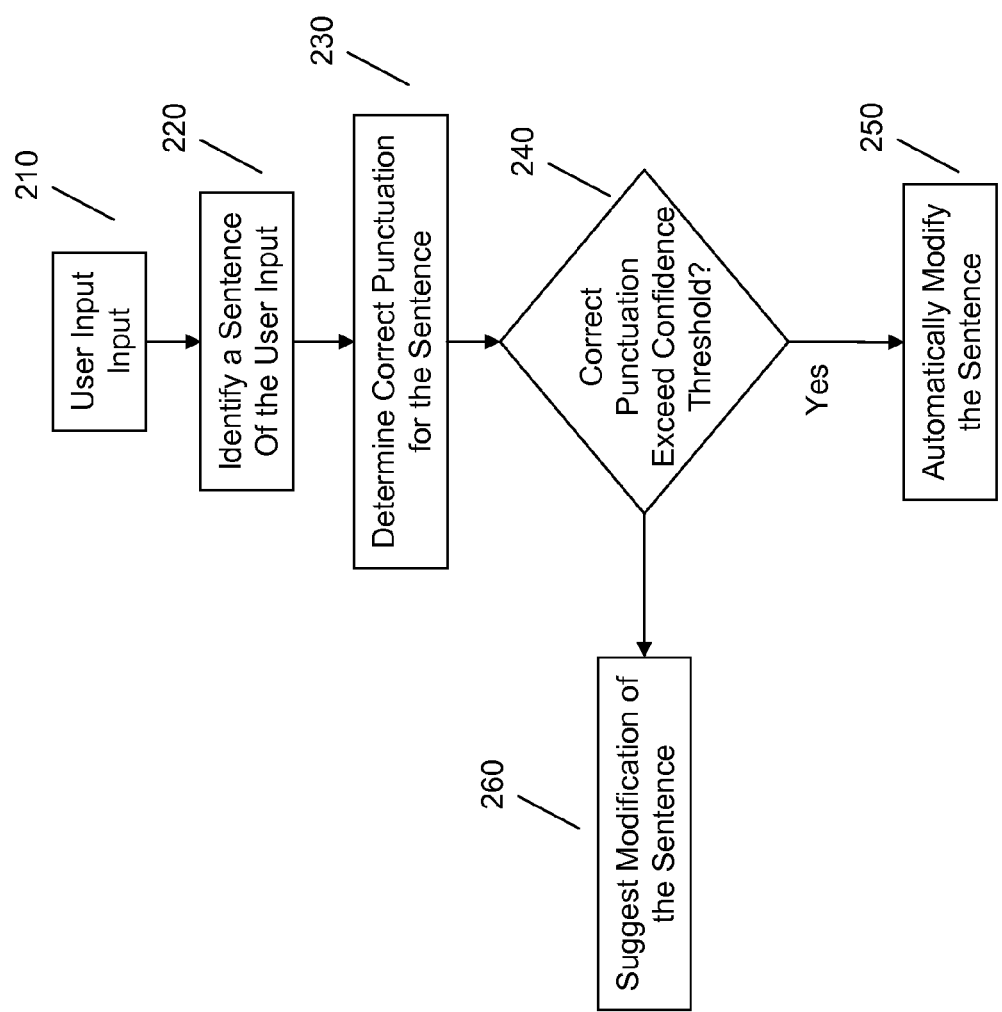
FIG. 2 illustrates an example method for automatically punctuating a sentence.

Referring generally to FIG. 2, an embodiment analyzes the user inputs to identify putative sentences (herein, a text string of two or more words), which in some case may in fact include sentence fragments (i.e., a "sentence" as used herein may include a clause or sentence fragment, e.g., commonly used or employed colloquially). The focus herein is that the analysis is performed not at the word level but based on two or more, or a series of, words.

Thus in FIG. 2 an embodiment receives user input at 210, e.g., text input or speech input converted to text, and analyzes the user input to identify a series of words to be considered a sentence at 220. In this regard, there are several approaches that may be acceptable in identifying a sentence at 220. For example, in a speech-to-text application, a simple pause (e.g., exceeding a timing threshold) may be used in order to separate user input words into logical groups for analysis. As will be understood by those having skill in the art, there are many techniques for parsing user inputs and identifying sentences (again which may include sentence fragments for the purpose of this description).

Having a series of words identified as a sentence at 220, an embodiment determines the "correct" punctuation at 230. In this regard, the correct punctuation determined at 230 will be understood to be correct in as much as there are many instances where more than one "correct" punctuation is possible. Moreover, there are many situations wherein the correct punctuation will not be known to a certainty given the user input.

Accordingly, an embodiment employs a confidence metric to determine the correct punctuation at 230. In this way, an embodiment will score (or otherwise rate or rank) a suggested punctuation for the sentence identified at 220 in step 230. At this point it is worth noting that although discreet blocks are utilized in the figures for ease of illustration, each block or blocks may include more than one step. Similarly, more than one block may be consolidated into a single step.

The confidence level may be modified such that the threshold for correcting punctuation is updated. For example, user feedback may be utilized to vary or modify the confidence level. Thus, for an initial confidence level, an embodiment may learn a new confidence level based on user feedback. Thus, if a user accepts punctuation changes without further modification, this feedback may be used to update or increase the confidence level. Similarly, if a user provides feedback rejecting the corrected punctuation, an embodiment may modify or reduce the confidence level being employed in the particular context. Additionally or in the alternative, a user may provide explicit input to modify a confidence level, e.g., by modifying setting via a menu selection, etc.

As an example, given the input of "Where are you" at 210, an embodiment may identify that three words are input at 210 followed by a pause (measured, e.g., in time if the input is verbal or by input of space characters if input by keyboard, etc.). Thus, at 220 the series of words "Where are you" is identified as the "sentence" by an embodiment.

To determine the correct punctuation for this sentence at 230, an embodiment may analyze the input using stored rules. For example, a rule may provide that when an interrogative pronoun such as "where" is utilized as the first word of a sentence, the correct punctuation mark is a question mark, "?". The rule may additionally include a confidence metric, e.g., 100%. Thus, in this case the confidence metric may be high (approaching or equaling complete confidence). An embodiment will thus determine at 240 that, given the confidence level exceeds a predetermined threshold (e.g., 80%), the punctuation of the sentence "Where are you" should be modified to "Where are you?" at 250.

It is worth noting that, although not illustrated in FIG. 2; the user input "Where are you" is indeed lacking the correct punctuation (as determined by an embodiment). In the case where the user has already supplied the correct punctuation (or an acceptable version of plural possible correct punctuation markings) an embodiment will recognize this and no modification may be implemented, as for example by reducing the confidence level of other identified correct punctuation, or a suggestion may be provided at 260, similar to when the correct punctuation cannot be determined to the requisite degree of confidence, as further described herein.

Therefore, when confidence is high that a particular punctuation would be correct, an embodiment may automatically insert the high confidence punctuation. The insertion of the correct punctuation mark(s) may be done immediately upon determining that the confidence level has been exceeded or an additional waiting period may be employed. For example, a trigger event may cause the modification of the punctuation. Thus, in speech-to-text applications the user input of the send button (e.g., in an email application, an SMS text application, etc.) may be used as a trigger to insert punctuation mark "?" on the end of a sentence. Moreover, waiting for a trigger event may allow an embodiment to refine the analysis of which punctuation is correct. Thus, if a confidence threshold level has not been exceed or is only exceeded slightly, e.g., by a predetermined amount, further pausing prior to implementing (or not implementing) a modification to the punctuation may allow for the collection and analysis of further user input that disambiguates the punctuation analysis.

As indicated herein, the rules utilized at 230 for determining the correct punctuation for a given user input may be complex. For example, in a speech-to-text application, sound characteristics such as voice inflection may be used to determine the end of a sentence and/or the type of sentence (e.g., statement, command, question, pointed question, etc.). Thus, for a given input, e.g., "Take care of it"; more than one punctuation mark may be appropriate for completing the input. For example, if the user's sound characteristics (e.g., pitch, tone, inflection, emphasis, etc.) indicate a command, the period punctuation mark "." may be appropriate. Alternatively, if the user's sound characteristics denote inquisitiveness, this input may be formed as a question, i.e., "Take care of it?". Likewise, if the sound characteristics indicate anger or surprise, an exclamation point may be most appropriate, i.e., "Take care of it!". Thus, a variety of characteristics (e.g., word order, sound characteristics, etc.) may be utilized to identify the correct punctuation and/or influence the score or ranking of putative correct punctuation identified.

As may be appreciated then, for situations in which there is an ambiguous input or more than one possible punctuation may apply, an embodiment implements rule(s) to score the possible correct punctuation mark(s) in order to proceed with confidence as to the automated modification of the input or lack thereof. If a confidence threshold level is achieved, e.g., indicating that an identified correct punctuation is indeed the desired input, an embodiment may proceed to automatically modify the input. However, if an embodiment does not identify a correct punctuation at 230 that also exceeds a predetermined confidence threshold at 240, either no modification may be implemented or suggested modifications may be provided at 260. In this way, an embodiment imparts both intelligence and user control over the automated modification of the punctuation.

A user may modify the confidence threshold level employed, or may choose various confidence levels for various modifications (e.g., lower threshold for automatically entering period punctuation marks, higher threshold for automatically entering exclamation points, a different confidence level for different application types, e.g., SMS text vs. email, etc.). Moreover, an embodiment may refine the confidence level analysis employed at 240, e.g., based on user history of accepting or rejecting automated modifications. For example, if a user rejects an automated modification, e.g., by removing it, an embodiment may increment the threshold necessary for making similar modifications, may alter the rules used to arrive at the confidence determination, etc.

Thus, an embodiment employs an intelligent modification to punctuation. For example, while typing, double-space text input or a long press on spacebar may trigger insertion of the correct punctuation, rather than the same punctuation mark (i.e., a period ".") in all cases. Moreover, if punctuation confidence does not meet a threshold at 240, the user may be prompted to select from a list of punctuation marks or modifications provided at 260. If a modification is implemented, e.g., automatically or via an accepted suggestion, a user may optionally be apprised of the modification, e.g., by a visual indicator thereof.

In an embodiment, if the user selects from the presented list at 260 or an automated modification is implemented at 250, these actions do not change the current cursor location. Thus, for example, in a speech-to-text application, such modifications may be implemented for a previous sentence while still allowing for continued voice input by the user. Therefore, implementing modifications to punctuation need not disrupt the user's concentration and input flow.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium is a non-signal medium that may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    receiving, at an information handling device input component, user input comprising a sentence;
    inserting, using a processor, the user input in an electronic document;
    identifying, using the processor, the sentence;
    determining, using the processor, correct punctuation for the sentence identified;
    determining, using the processor, a confidence level for the correct punctuation determined; and
    responsive to the confidence level exceeding a predetermined threshold, automatically modifying, using the processor, the sentence based on the correct punctuation determined, wherein the automatically modifying comprises correcting existing punctuation.

2. The method of claim 1, wherein the automatically modifying includes a modification selected from the group of modifications consisting of automatically inserting a missing punctuation mark, and automatically removing an existing punctuation mark.

3. The method of claim 1, further comprising detecting a trigger event prior to the automatically modifying the sentence based on the correct punctuation determined.

4. The method of claim 1, wherein the identifying a sentence includes identifying an end location for the sentence.

5. The method of claim 3, wherein:
    the input component comprises a microphone; and
    identifying an end location for the sentence comprises identifying a pause in verbal input.

6. The method of claim 1, wherein:
    the input component comprises a microphone; and
    determining correct punctuation comprises analyzing voice characteristics of the user input.

7. The method of claim 1, further comprising responsive to the confidence level not exceeding a predetermined threshold, presenting the user with suggested punctuation.

8. The method of claim 7, wherein a location for input of suggested punctuation is maintained as further user input is received.

9. The method of claim 1, wherein a location for further user input insertion is not modified as a result of the automatically modifying the sentence based on the correct punctuation determined.

10. The method of claim 1, wherein the confidence level is modified based on user feedback.

11. An information handling device, comprising:
    an input component;
    a processor;
    a memory device assessable to the processor and storing code executable by the processor to:

receive, at the input component, user input comprising a sentence;
insert, using the processor, the user input in an electronic document;
identify, using the processor, the sentence;
determine, using the processor, correct punctuation for the sentence identified;
determine, using the processor, a confidence level for the correct punctuation determined; and
responsive to the confidence level exceeding a predetermined threshold, automatically modify, using the processor, the sentence based on the correct punctuation determined, wherein the automatically modifying comprises correcting existing punctuation.

12. The information handling device of claim 11, wherein to automatically modify includes a modification selected from the group of modifications consisting of automatically inserting a missing punctuation mark, and automatically removing an existing punctuation mark.

13. The information handling device of claim 11, wherein the code is further executable by the processor to detect a trigger event prior to the automatically modifying the sentence based on the correct punctuation determined.

14. The information handling device of claim 11, wherein to identify a sentence includes identifying an end location for the sentence.

15. The information handling device of claim 14, wherein:
the input component comprises a microphone; and
identifying an end location for the sentence comprises identifying a pause in verbal input.

16. The information handling device of claim 11, wherein:
the input component comprises a microphone; and
to determine correct punctuation comprises analyzing voice characteristics of the user input.

17. The information handling device of claim 11, wherein the code is further executable by the processor to, responsive to the confidence level not exceeding a predetermined threshold, present the user with suggested punctuation.

18. The information handling device of claim 17, wherein a location for input of suggested punctuation is maintained as further user input is received.

19. The information handling device of claim 11, wherein the confidence level is modified based on user feedback.

20. A program product, comprising:
a storage device having computer readable program code stored therewith, the computer readable program code comprising:
computer readable program code configured to receive, at an information handling device input component, user input comprising a sentence;
computer readable program code configured to insert, using a processor, the user input in an electronic document;
computer readable program code configured to identify, using the processor, the sentence;
computer readable program code configured to determine, using the processor, correct punctuation for the sentence identified;
computer readable program code configured to determine, using the processor, a confidence level for the correct punctuation determined; and
computer readable program code configured to, responsive to the confidence level exceeding a predetermined threshold, automatically modify, using the processor, the sentence based on the correct punctuation determined, wherein the automatically modifying comprises correcting existing punctuation.

* * * * *